United States Patent [19]

Goldberg

[11] 4,168,116
[45] Sep. 18, 1979

[54] APPARATUS FOR OPTIMIZING CAMERA IMAGE SURFACE TO IMAGE RECEIVING SURFACE

[75] Inventor: Norman N. Goldberg, Madison, Wis.

[73] Assignee: Ziff-Davis Publishing Company, New York, N.Y.

[21] Appl. No.: 857,824

[22] Filed: Dec. 5, 1977

[51] Int. Cl.² .................. G03B 13/16; G03B 19/12
[52] U.S. Cl. .............................. 354/152; 354/195; 354/201
[58] Field of Search ............ 354/152, 155, 167, 195, 354/196, 199–201, 202, 203; 352/139, 140, 228; 350/175 FS, 186, 197

[56] References Cited

U.S. PATENT DOCUMENTS

| | | | |
|---|---|---|---|
| 2,544,864 | 3/1951 | Tham et al. | 354/202 |
| 2,651,238 | 9/1953 | Garutso | 350/197 |
| 2,933,028 | 4/1960 | Mische | 354/167 |
| 3,006,248 | 10/1961 | Linke et al. | 354/202 |
| 3,182,577 | 5/1965 | Ohnaka | 354/160 |
| 3,426,665 | 2/1969 | Maeda | 354/160 |
| 3,587,431 | 6/1971 | Holler | 354/25 |
| 4,047,207 | 9/1977 | Altman et al. | 354/152 |
| 4,064,520 | 12/1977 | Freudenschuss | 352/140 X |

FOREIGN PATENT DOCUMENTS 567354 8/1930 Fed. Rep. of Germany ............ 354/195
V 7815 3/1956 Fed. Rep. of Germany ............ 354/195

Primary Examiner—John Gonzales
Attorney, Agent, or Firm—Theodore J. Long; Harry C. Engstrom; Nicholas J. Seay

[57] ABSTRACT

Apparatus within a camera for optimizing the location of the image surface of the lens of a camera relative to the image receiving surface such as film for different adjustments of the lens. A camera having an adjustable lens, nominal image receiving surface, focusing analog, and apparatus for adjusting the position of one such element with respect to the others to compensate for changes in the position of the image surface caused by adjustment of the lens to thereby place the image surface in best fit relationship to the nominal image receiving surface when correct focus is indicated by the focusing analog. The apparatus may provide for manual adjustment utilizing a setting determined on the basis of the focus setting, aperture setting and focal length setting of the lens. Automatic compensation may alternatively be provided within the camera as changes are made in lens adjustment.

17 Claims, 7 Drawing Figures

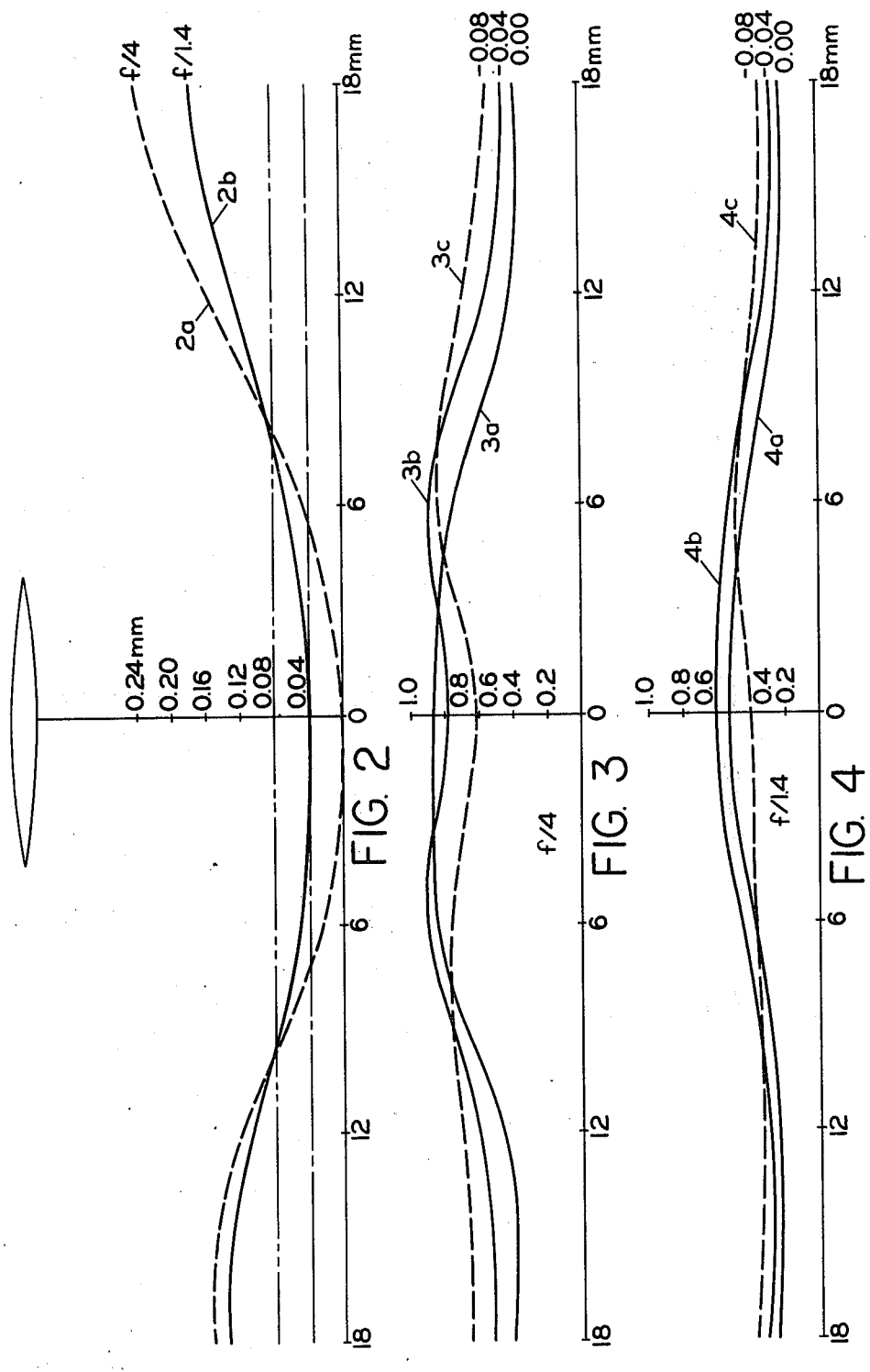

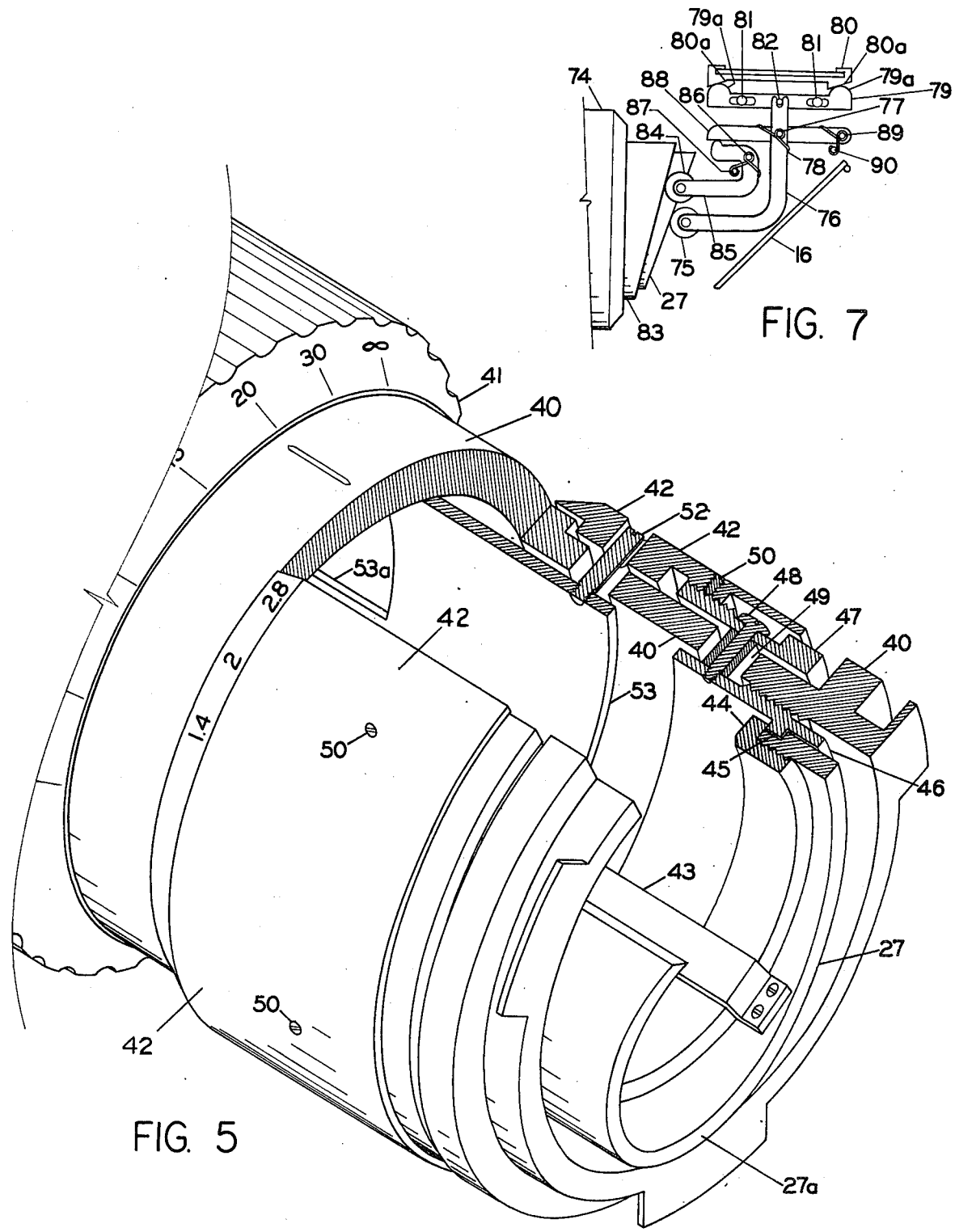

APPARATUS FOR OPTIMIZING CAMERA IMAGE SURFACE TO IMAGE RECEIVING SURFACE

BACKGROUND OF THE INVENTION

1. Field of the Invention

This invention pertains generally to the field of cameras and more particularly to cameras having adjustable lenses.

2. Description of the Prior Art

Present quality cameras all utilize lenses which are adjustable with respect to focus or distance setting, aperture setting, and sometimes focal length. In addition, such cameras have a nominal image receiving surface (film plane in the case of a film camera, or surface of other substance capable of recording the image as in a television camera), and a focusing analog of the nominal image receiving surface for indicating or determining correct focus. As used herein, "focusing analog" means any apparatus or object used in connection with a camera whereby an approximation or analog of the image which will be projected by the lens onto the image receiving surface can be visually or electronically observed prior to shutter release. This is typically accomplished in a single lens reflex camera by utilizing a flip-up mirror which directs the image from the lens onto a focusing screen which is then optically transmitted to the eye of the photographer. In theory, the focusing screen and the nominal film plane of the camera are optically equidistant from the lens so that the image on the focusing screen is exactly the image that will be presented to the film. Thus the photographer can manipulate the focus adjustment on the lens assembly as desired until the object appears in focus to him. Additionally, most single lens reflex cameras provide a focusing aid at the center of the focusing screen.

Other types of cameras utilize focusing analogs which does not perceive the image through the actual lens of the camera. Examples of these cameras are the double lens reflex camera and the coupled rangefinder camera. The coupled rangefinder camera has utilized various ranging devices such spaced mirrors or more sophisticated means to converge upon an object and provide information as to the distance from the lens to the object. The rangefinder is coupled to the lens in a predetermined relationship such that when the rangefinder shows that focus has been achieved, theoretically the image of the object should be focused by the lens upon the film within the camera. Studio cameras may simply provide a focusing screen which is positioned within the camera at the nominal film plane during focusing of the lens after which it is replaced by the film prior to shutter release.

With all practical lens systems used in cameras, the actual "image surface" (that surface which would intercept the best focus of the image at an infinitude of points within the image) generated by the lens for any setting of the lens is not a perfect plane and thus cannot be made to precisely coincide with any nominal film plane. This is so because of residual aberrations such as spherical aberration and astigmatism which occur in any practical lens system, and is well known to camera and lens manufacturers. As a result of these departures from perfect lens systems, the actual image surface will be curved and buckled, and frequently somewhat skewed at an angle with respect to the nominal plane of the film because of manufacturing defects. The film itself may, of course, depart in position from the nominal film plane because of ripples in the film and twisting within the film holder, but the nominal film surface is normally assumed to be a plane.

One means of determining the shape of the image surface is to perform through-focus contrast testing, in the manner explained below, to develop a three-dimensional picture of the image surface of the lens. It is found that the shape and position of the image surface varies both with the focus adjustment, the aperture setting and the focal length of the lens. Of course, the shape and variability of the image surface will be different from lens to lens. Typically, the manufacturer of the camera will attempt to fix the position of the nominal film plane with respect to the lens such that the film plane is fit to some average focus and aperture setting of the lens. Where the actual focus and aperture setting varies considerably from the average set by the manufacturer, loss of focus will occur at some portions of the film, particularly in the peripheral area surrounding the center of the picture. Accordingly, even the highest quality present cameras do not achieve optimum focusing of the image on the image receiving surface for most lens adjustments, and produce pictures in which substantial areas exhibit substantial loss of contrast and sharp focus.

SUMMARY OF THE INVENTION

My invention employs apparatus in a camera for adjusting the image surface to a predetermined best fit position in relation to the nominal image receiving surface for each adjustment of the lens when correct focus is indicated by the camera focusing analog. The best fit relationship may be achieved by adjustment of the position of the lens, the nominal image receiving surface or the focusing analog. For cameras with through the lens focusing, it is preferable to adjust the position of the focusing analog to compensate for changes in the position of the image surface caused by adjustment of the lens. This places the image surface in best fit relationship to the nominal image receiving surface when correct focus is indicated by the focusing analog to the operator or automatic focusing system. For cameras which are not focused through the lens, such as rangefinder cameras, the position of the lens may be adjusted with respect to the nominal image receiving surface to compensate for image surface changes caused by lens adjustment.

A manual adjustment member may be provided which is manually movable from the exterior of the camera and which is operatively connected to the camera element which is to be adjusted whereby movement of the adjustment member between predetermined positions will cause the position of the camera element to be adjusted to compensate for image surface changes. Automatic adjustment may be provided by operatively connecting the lens assembly adjustment elements to the camera element to be adjusted whereby adjustment of the lens will drive the camera element to predetermined compensating positions when the lens is adjusted.

Whether best fit adjustment of the image surface is accomplished manually or automatically, the compensating adjustment of the camera element must be keyed to the image surface characteristics of the lens as predetermined by calculation or tests. Indicia are provided to indicate correct predetermined compensating positions of the manual adjustment member for each lens adjustment setting. In the case of automatic adjustment the connecting members between the lens assembly adjustment elements and the camera element to be adjusted must be designed to provide the correct adjustment of the camera element for each lens adjustment setting based on the charateristics of the lens.

It is a principal object of my invention to provide a means for adjusting the position of the camera lens, nominal image receiving surface plane or focusing analog to cause the image surface to be placed in best fit relationship to the nominal image receiving surface, for each adjustment of camera lens focus, aperture and focal length.

Further objects, features, and advantages of my invention will be apparent from the following detailed description taken in conjunction with the accompanying drawings, showing preferred embodiments of apparatus for cameras which exemplify the principles of my invention.

BRIEF DESCRIPTION OF THE DRAWINGS

In the drawings:

FIG. 2 is an illustrative graph showing a typical image surface for a selected lens.

FIG. 3 is an illustrative graph corresponding to the lens of FIG. 2 showing image contrast curves for an aperture setting of F/4.

FIG. 4 is an image contrast graph corresponding to the lens of FIGS. 2 and 3 showing image contrast curves for an aperture setting of F/1.4.

FIG. 5 is a perspective view of a portion of a camera lens assembly incorporating my automatic adjustment means which has been partially sectioned to illustrate the relationship of parts.

FIG. 7 is a partial schematic pictorial view of another embodiment of my apparatus for optimizing the image surface to the image receiving surface for employment with a lens having focus setting, aperture setting and focal length adjustments.

DESCRIPTION OF THE PREFERRED EMBODIMENTS

Figure 1:
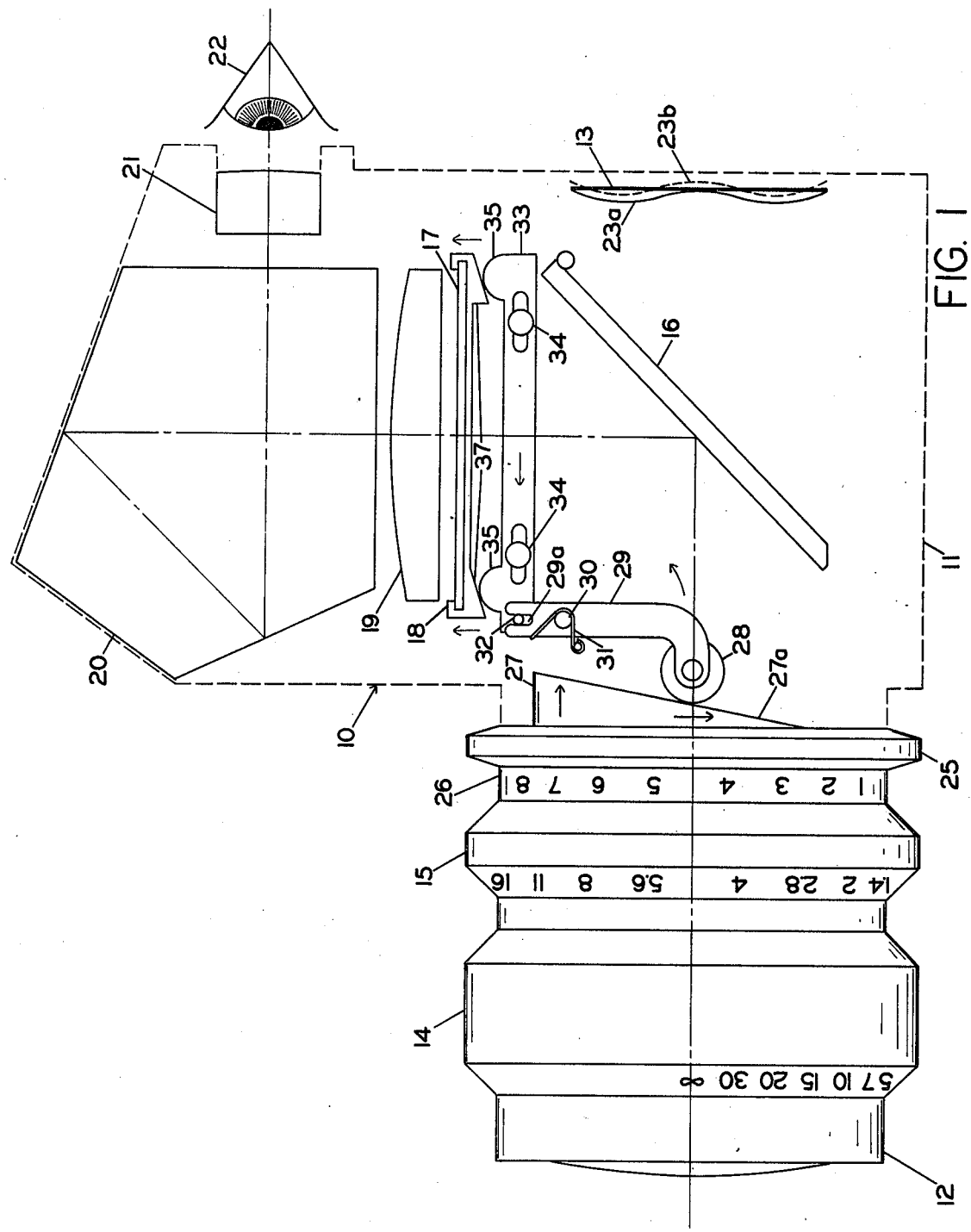
FIG. 1 is a schematic pictorial view of the essential components of a single lens reflex camera incorporating a preferred embodiment of my apparatus for optimizing the image surface to the image receiving surface in accordance with my invention.

Referring now more particularly to the drawings, wherein like numerals refer to like parts in each view, a preferred embodiment of my apparatus for optimizing image surface to image receiving surface in a typical single lens reflex camera is shown generally at 10 in somewhat simplified schematic form in FIG. 1. For purposes of illustration, the exterior housing and body of the camera is shown generally as the dashed line 11 in FIG. 1, it being understood that the precise construction of the camera is not critical to my invention and that generally standard camera constructions can be utilized therewith. A lens assembly 12 is mounted to the front of the camera housing 11, focuses an image of the desired object onto a nominal image receiving surface or film plane 13. For purposes of adjustment, it is assumed that the film plane 13 is exactly perpendicular to the long (optical) axis of the lens and that the film will lie exactly on the nominal film plane. As previously indicated, these assumptions are not necessarily correct in practical cameras, since some twisting and buckling of the film within the film holder (not shown) may occur. However, the nominal film plane as defined by the film holder represents the most likely location of the film. The lens assembly 12 includes a focusing collar 14, the turning of which provides the adjustable longitudinal motion of the lens to allow the lens to bring objects at varying distances into focus at the general position of the nominal film plane. The lens assembly also includes an aperture selecting ring or collar 15 which allows adjustment of the lens aperture to a desired F-stop.

The interior of the single lens reflex camera shown illustratively in FIG. 1 includes a hinged reflex mirror 16 which flips-up prior to release of the shutter (not shown in FIG. 1) to permit the lens to project the desired image onto the film for exposure. During focusing of the camera, the image of the object is projected by the lens onto the mirror 16, which reflects it up to a focusing screen 17 held in place by a surrounding frame 18. The focusing screen is formed of ground glass or other translucent material and in a typical single lens reflex camera is positioned the same optical distance from the lens as the nominal film plane 13 so that the same focused image is formed on the focusing screen and on the film. Accordingly, the focusing screen 17 comprises a "focusing analog" whereby the user can view an image similar to that which will be projected onto the film, and can adjust the position of the lens by means of focusing collar 14 until the image on the focusing analog (focusing screen 17) appears to be in best focus. As is customary in single lens reflex cameras, the image formed on the focusing screen 17 in the embodiment of FIG. 1 is transferred through a field lens 19, at pentaprism 20, and an ocular 21 to the viewer's eye shown illustratively at 22.

The image surface formed by the lens does not lie in a perfect plane due to the residual aberrations of the lens which results in the actual image surface being "buckled" or curved. A cross-section of such a curved surface is shown in FIG. 1 as the line labeled 23a. The surface 23a may also be skewed at an angle to the plane 13 because of manufacturing defects associated with the lens. It is seen that the surface 23a exactly coincides with the nominal film plane only at the outer edges and center portion. The areas along the periphery of the image, in a ring surrounding the center, are slightly out of focus. Generally, the same sort of image surface will be formed at the focusing screen 17 and will be perceived by the viewer. The photographer tends to adjust his camera to cause best focus to occur at the center of the film image, and thus the situation detected in FIG. 1 in which the image surface 23a coincides with the film plane only at the outer edges and center thereof will be quite common. Moreover, many, if not most, single lens reflex cameras utilize a focusing aid which is itself located at the very center of the screen and requires the viewer to adjust focus until the focusing aid indicates that correct focus has been obtained. It may be observed that a better overall focus of the image surface on the film plane would occur if the image surface were moved back to the position shown at 23b in FIG. 1. In this situation, some sharpness of focus is lost at the center of the film, but a much better overall focus is obtained over the entire frame of film. Some camera and lens manufacturers have attempted to compensate for the curvature of the image surface by positioning the nominal film plane such that it is slightly different in optical distance from the lens than the optical distance from the lens to the focus screen, such that the film plane will provide a good fit to the overall image surface when the image surface is exactly in focus at the center of the focusing screen. However, this match is obtained only at a single focus setting and a single aperture setting, since the shape and position of the image surface changes with changes in focus and aperture. In addition, the shape and position of the image focus surface changes with changes in the focal length of the lens in the case of a "zoom" lens.

The characteristics of a particular lens can be determined by performing through-focus contrast readings on the lens system using standard techniques. See Goldberg, *Popular Photography*, September, 1977, pp. 18–22 and 131.

It is found that the shape and position of the image surface changes with the focus adjustment such that readings as determined by such tests must be made for a selected number of object distances from a selected close up distance to "infinity". It is also found that even where the focus setting is adjusted to provide focus of an object at a fixed distance from the camera, the shape and position of the image surface also changes with the aperture setting. Thus, to provide a true determination of the changes that take place in the image surface it is also necessary to record the changes made in the image surfce at a selected object distance through a series of F-stop settings. For example, for a given lens and a given object distance, curve 2a of FIG. 2 illustrates the shape of the image surface at an aperture reading of F/4. Curve 2b shows the shape of the surface where the aperture is opened up to F/1.4. If the nominal film plane is assumed to lie at the bottom of curve 2a, it can be seen that a better overall focus could be acheived if the film plane were moved toward the lens 0.04 mm. This is confirmed by referring to FIG. 3 which is a plot of the contrast readings taken at an F-stop of F/4, wherein the vertical axis represents degree of contrast, 100% contrast being represented as 1.0. Curve 3a corresponds to readings taken along the nominal film plane, curve 3b corresponds to readings taken 0.04 mm toward the lens, and curve 3c corresponds to readings taken 0.08 mm toward the lens. It can be seen that curve 3b has slightly less image contrast along the center axis than does 3a, but has much better image contrast over the remainder of the surface. Curve 3c shows even better image contrast over the outer zones of the image, with some additional sacrifice of contrast at the center, which still exhibits satisfactory contrast. Thus, the position of the film plane corresponding to curve 3c would be the best fit of the film plane to the actual image surface. This could be achieved by moving the film holder 0.08 mm inward toward the lens without changing the position of the focus screen with respect to the lens. Thus, when the viewer adjusts the lens such that best focus was obtained in the center of the image, the film plane would actually be 0.08 mm closer to the lens than the focus screen and a better overall focus would be obtained. The manufacturer may himself do this by placing the film holder slightly closer to the lens than the focus screen.

Fixing the distance relationship between the lens and the film plane and the lens and the focus screen does not yield optimum results where either the focus distance or the aperture size is changed. For example, as shown in FIG. 2, the image surface at F/1.4 has a substantially different shape than the image surface for the same object distance at F/4. Referring to FIG. 4, curve 4a is a curve of contrast at F/1.4 for the lens of FIG. 2 where the film plane is located at the nominal film plane (0.00 mm), curve 4b shows image contrast where the film plane is 0.04 mm closer to the lens, and curve 4c shows image contrast where the film plane has been moved 0.08 mm toward the lens. It is seen that while moving the plane 0.08 mm toward the lens provided the most staisfactory fit of image surface to film plane for an aperture setting of F/4, it provides an unacceptably poor central image contrast for an aperture setting of F/1.4. Thus, from the above curves it can be seen that it would be preferred to be able to move the film plane toward the lens 0.08 mm at an aperture setting of F/4, but the film plane should be moved toward the lens perhaps 0.04 to 0.05 mm at an aperture setting of F/1.4.

While it is possible to provide the best fit of film plane to image surface by moving the film plane, it is also possible and usually preferable to accomplish the same result by holding the film plane fixed but moving the focus screen toward or away from the lens. For example, with reference to FIG. 1 it can be seen that the displacement of the focus screen 0.04 mm away from the lens and the focusing of the image surface 2a (FIG. 2) at the center of the focusing screen will have the same effect as moving the film plane 0.04 mm closer to the lens.

Referring again to FIG. 1, the figure illustrates one preferred embodiment of my improved camera which incorporates means for providing the desired compensating offset adjustment of the image surface for given object distances and aperture settings on the lens. The adjustment means includes an additional adjustment member in the form of ring 25 which is coordinated with indicia 26 on the lens assembly such that the ring can be moved or turned to preselected positions designated by the indicia. The photographer can determine the setting that the adjustment should be moved to with respect to the indicia 26 by reading off the object distance readings from the focusing collar 14 after preliminary focusing and the aperture settings from the aperture adjustment collar 15; locating the particular focus and aperture settings in a table prepared for the particular lens of the camera and provided with the camera based on through the lens testing as previously described; reading from the table the position of the adjustment ring 25 required to produce the desired compensating adjustment of the focusing screen 17 as described below, and moving the adjustment ring to the proper position as indicated by the indicia 26. The photographer then adjusts final focus by moving the focusing collar 14 to the best focus position as indicated on the displaced focusing screen 17, and a best fit of the image focus surface to the nominal film plane will have been achieved.

The motion of the adjustment ring 25 is transferred to the focusing screen 17 by other elements of the adjustment means as hereafter described. A helical cam 27 is attached to the ring 25 to rotate therewith, and has a cam surface 27a on which a rolling cam follower 28 rides. The cam follower is rotatably mounted to link 29 which is pivotally mounted by pin 30 to the body of the camera. A spring 31 provides bias of the link 29 and cam follower 28 against the cam surface 27a. A slot 29a is formed in the end of the link 29 and engages a pin 32 which is attached to a longitudinally movable carriage 33. The carriage is held for this controlled longitudinal movement by pins 34 which are attached to the body of the camera. A pair of semi-circular bearing surfaces 35 protrude from the upper portion of the carriage and engage the included plane surfaces 37 extending from the bottom of the focusing screen holding frame 18. Longitudinal movements back and forth of the carriage 33 will result in upward or downward movement of the frame 18 and focusing screen 17, which are held within the body of the camera for sliding up and down movement only, with the focusing screen 17 always maintained perpendicular to the center axis of the incoming optical image. Such constraining apparatus may be generally of the type shown in FIG. 6 and described below for a similar purpose. It is apparent that turning of the cam 27 by the adjustment ring 25 will transmit displacement through the cam follower 28 and link 29 to cause the desired upward and downward movement of the focusing screen 17 in substantially constant relationship therewith. The focusing screen 17 and its holding frame 18 are biased downward by a spring (not shown in FIG. 1), which may be of the type shown at reference number 71 of FIG. 6.

A mechanism and means for causing automatic adjustment of the position of the focusing screen with changes in lens adjustment is shown in the preferred embodiment of FIG. 5. The mechanism as shown allows for the translation of movements of the lens focus adjustment and aperture adjustment into movements of a cam 27. A substantially standard lens barrel housing 40 has a focus adjustment collar 41 and an aperture adjustment collar 42 mounted thereto for rotational motion. The lens barrel housing 40 does not in the embodiment of FIG. 5 have the manual adjustment ring 25 shown in FIG. 1. The internal lenses and mechanisms used to move the lenses for focus adjustment and adjustment of aperture are not shown in FIG. 5, but it is understood that they may be of entirely conventional design.

Rotary motion of the focusing collar 41 is directly transmitted to the cam 27 by an arm 43. The connection of the arm 43 to the focusing collar 41 (not shown in FIG. 5) transmits rotary motion of the collar 41 to the arm 43 but permits the arm 43 to freely move back and forth longitudinally with axial motions of the cam 27. The cam 27 is threaded to a flange 44 to form a peripheral groove the walls of which engage with a mating peripheral lip 45 on the inner surface of a first sleeve member 46. The outside surface of the sleeve 46 has threads formed thereon of selected pitch and lead which engage mating threads on the housing 40 such that rotation of the sleeve 46 with respect to the housing will cause it to be drive axially in a direction depending on the direction of rotation of the sleeve 46. The first sleeve member 46 is attached to a second sleeve member 47 by a screw 48. The screw 48 fits within a slot 49 in the housing 40 to allow the screw to rotate with the second sleeve 47 over a limited range of rotation. The slot 49 is sufficiently wide to allow limited longitudinal movement of the screw 48 as the inner sleeve 46 is screwed inwardly and outwardly. The second sleeve member 47 is threadedly engaged to the aperture adjustment collar 42, with set screws 50 being used to secure the collar 42 to the second sleeve member at a desired position. The threaded engagement of the aperture collar 42 with the sleeve member 47 allows fine tuning adjustment of the longitudinal position of the cam 27. The aperture adjustment ring 42 is also engaged by a threaded pin 52 to an inner aperture ring 53 which has a forwardly extending arm portion 53a linked to the lens aperture mechanism (not shown).

It can be seen that as the focusing collar 41 is turned back and forth the arm 43 will cause turning of the cam 27 such that the cam follower 28 (with reference to FIG. 1) will ride up on the cam surface 27a of the cam. Additionally, as the aperture adjustment collar 42 is turned, the sleeve 46 will rotate with respect to the housing 40 to drive the entire cam 27 axially inwardly or outwardly depending on the direction of rotation of the aperture collar. It is apparent that the angle and shape of the cam surface 27a and the pitch and lead of the threading between the sleeve 46 and the housing 40 can be designed to give the relative desired range of movement for any particular lens under consideration.

Figure 6:
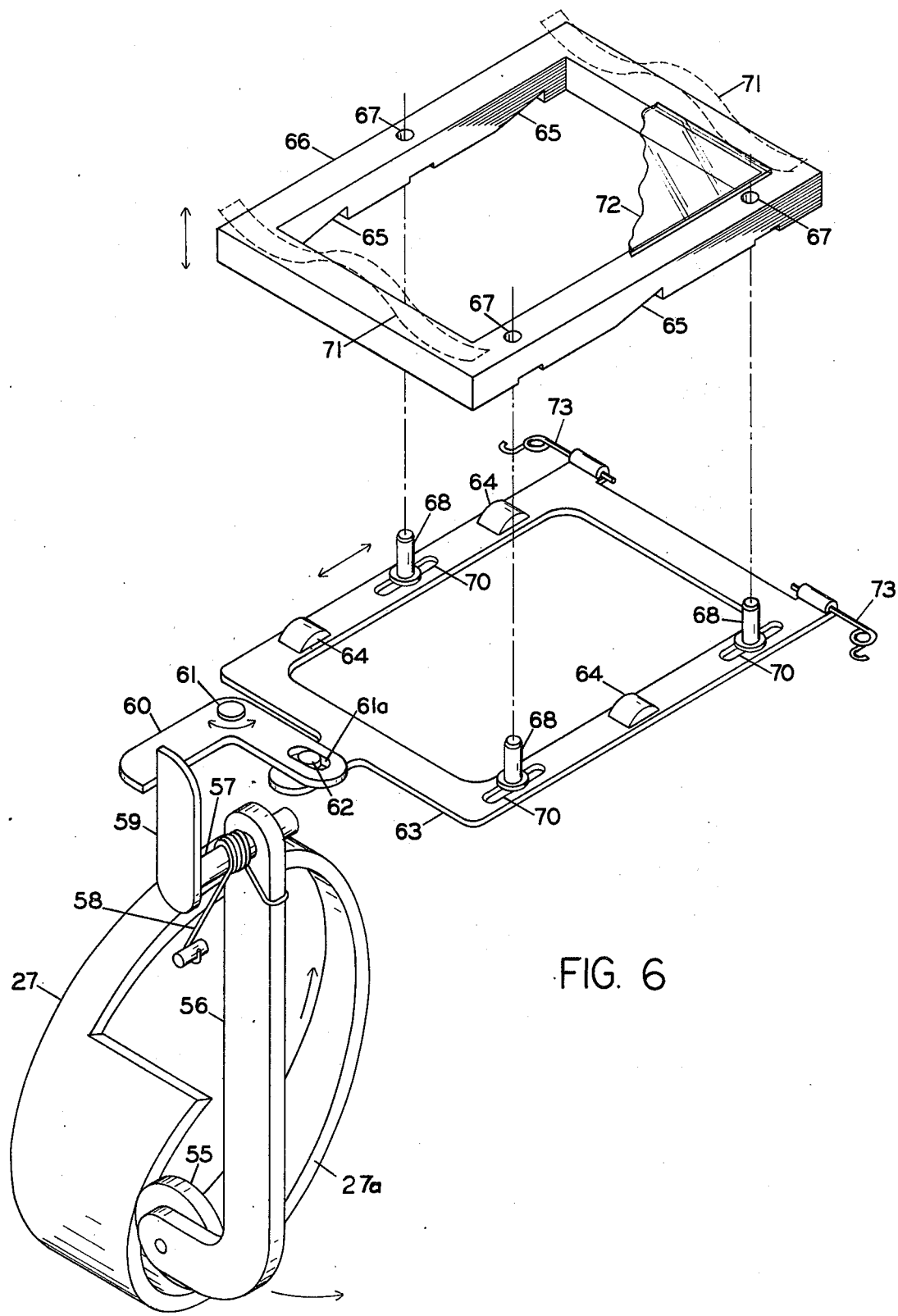
FIG. 6 is a schematic perspective exploded view of an another embodiment of my mechanism for transferring motion of a cam surface to the focusing analog of my improved camera.

A modified mechanism for translating the motion of the cam 27 to up and down movements of the focusing screen is shown in FIG. 6. The mechanism shown in FIG. 6 is adapted for the typical single lens reflex camera having a rectangular shaped body with the greater lateral than longitudinal dimension, and is especially adapted to fit within the spaced constraint of a typical single lens reflex camera. A cam follower 55 rides on the cam surface 27a, and is rotatably connected to a link 56. The other end of the link 56 is attached to a pin 57 which is itself pivotally mounted to the frame of the camera (not shown) such that movements of the link 56 are converted to rotational movements of the pin 57. A spring 58 urges the link 56 toward the cam 27 so that the cam follower 55 is always biased against the cam surface 27a.

The pin 57 is connected at its free end to an upwardly extending arm 59 which engages a lever 60. The lever 60 is mounted by a pivot pin 61 to the body such that the arm 60 rotates in a direction perpendicular to the rotation of the arm 59. The other end of the lever 60 has a slot 61a therein in which a pin 62 rides. The pin 62 is rigidly connected to a carriage 63 such that arcuate rotation of the arm 60 will drive the carriage 63 back and forth laterally within the camera body. A plurality of semi-circular bosses 64 (three shown) are formed on the upper surface of the carriage. These bosses meet with inclined ramp surfaces 65 formed in the bottom side of the focusing screen frame 66 on which the focusing screen 72 is mounted. The frame 66 has a plurality of holes 67 therein (three shown) which engage fixed guide pins 68 extending upwardly through the carriage 63. The guide pins constrain the frame 66 so that it can only move directly upward or downward, with the focusing screen 72 always perpendicular to the axis of the incoming image. The carriage has lateral slots 70 through which the guide pins 68 extend to permit the carriage to slide laterally back and forth. As the carriage moves inwardly toward the link 56, the bosses 64 engage against the inclined or angled ramp surfaces 65 to drive the focusing frame 66 directly upwardly. A pair of springs 71 mounted between the upper side of the focusing screen frame and the camera housing (not shown) urge the frame 66 downwardly so that when the carriage is moved away from the link 56 the frame will follow such movements downwardly with the ramp surfaces 65 always in engagement with the surfaces of the bosses 64. Biasing springs 73 urge the carriage away from the link 56 to prevent backlash in the mechanism.

As previously indicated, changes in lens focal length, as provided by a zoom lens, also produce changes in the location and characteristics of the image surface of the lens. Accordingly, for a camera equiped with a zoom lens it is also desirable to provide for adjusting the image surface in response to changes in focal length of the lens to achieve a predetermined best fit position. Two ways of accomplishing this can be illustrated by reference to the drawings. In FIG. 1, if a focal length adjustment were added to the lens assembly 12 in a known manner, the additional effects of the focal length adjustment on the position and characteristics of the lens image surface would be determined by testing in the same manner as the effects of focus and aperture adjustment are determined. The operator would then be provided with information which would show the correct setting of the manual adjustment ring 25 to provide the correct compensating adjustment of the cam 27 and focusing screen 17 to achieve a best fit position of the image surface to the image receiving surface.

Apparatus for providing an automatic compensating adjustment for changes in lens focal length, in addition to adjustments for changes in focus and aperture setting, is illustrated by the partial schematic view of FIG. 7. As shown, a zoom lens assembly 74 in a single lens reflex type camera provides for lens adjustment with respect to focal length, focus and aperture setting in a conventional manner. A first cam 27 is driven rotatally and axially by motion of the focusing collar and aperture adjustment collar of the lens assembly as previously illustrated and described with respect to the structure of FIG. 5. Movement of the cam 27 displaces cam follower 75 mounted on link 76 which pivots on pin 77 to transfer longitudinal motion to pin 82 mounted on carriage 79 which is slidable longitudinally on pins 81. Longitudinal movement of the carriage 79 is converted into vertical movement of the focusing screen frame 80 by bearing surfaces 79a of carriage 79 which slidably engage inclined plane surfaces 80a of the focusing screen plane 80, as previously described with respect to comparable structure shown in FIG. 1. A second cam 83 is mounted at the rear of the lens assembly 74 and is operatively connected to the focal length adjustment member of the lens whereby movement of the focal length adjustment member will cause rotation of the cam 83 in a manner similar to that previously illustrated and described with respect to cam 27. The cam 83 is engaged by cam follower 84 mounted on link 85 which is pivotally attached to the body of the camera by pin 86. Cross arm 88 is pivotally attached to the camera body by pin 89 at one end of the cross arm. Pivot pin 77 for link 76 is mounted on cross arm 88 near the midpoint thereof to pivotally support link 76 as previously described. The free end of cross arm 88 is engaged by the upper end of link 85 whereby displacement of cam follower 84 due to rotation of cam 83 causes the free end of cross arm 88 to be raised or lowered, depending upon the direction of movement of the cam 83. Raising or lowering of the free end of the cross arm 88 causes link 76 to be proportionally raised and lowered thereby changing the position of cam follower 75 on cam 27, causing lateral displacement thereof, which motion is transferred to the focusing screen frame 80 in the manner previously described. Accordingly, changes in the position of cam 83 resulting from changes in the focal length setting of the lens 74 produce compensating changes in the position of the focusing screen frame 80 to permit automatic best fit adjustment of the image focus surface of the lens in response to changes of the lens focal length, focus and aperture setting. The links and cross arms are biased by spring 78, 87 and 90 to maintain the cam followers 75 and 84 in engagement with the cam surfaces of cams 27 and 83 in a conventional manner.

As previously indicated, for cameras wherein the focusing analog does not employ through the lens viewing, adjustment of the image surface may be accomplished by direct adjustment of the position of the lens assembly or the focus setting element of the lens with respect to the nominal image receiving surface. For example, if the lens of FIG. 1 were employed as the taking lens on a twin lens reflex camera, the cam 27 could be omitted, and the manual adjustment ring 25 could be operatively connected to a sleeve threadedly mounted to the taking lens, whereby manual rotation of the adjustment ring 25 between predetermined positions identified by indicia 26 would cause lineal motion of at least one element of the lens to displace the image surface a desired amount. Accordingly, for given focus and aperture settings of the lens, the photographer could rotate the manual adjustment ring 25 to the correct predetermined position as shown by the indicia 26 to move the lens axially toward or away from the nominal image receiving surface plane to compensate for changes in the image focus surface resulting from adjustment of the lens.

As previously indicated, a best fit relationship of the image surface to the nominal image receiving surface can also be accomplished by adjustment of the position of the nominal image receiving surface. Such an adjustment is clearly the equivalent of adjusting the position of the focusing screen as illustrated and described herein with respect to a single lens reflex camera, and could be accomplished using carriage and frame mechanisms similar to those illustrated herein with respect to the focusing screen, with only simple changes in the shape and position of the carriage, frame and cam follower links in a manner which would be obvious to a person of ordinary skill in the art with reference to the accompanying figures. As a practical matter, in cameras where film is employed as the image receiving surface, adjustment of the nominal film plane is less practical than adjustment of either the focusing screen or lens positions because of the difficulties involved in maintaining a stable film surface when the nominal film plane is being moved around within the camera.

It is understood that my invention is not confined to the particular construction and arrangements of parts herein illustrated and described, but encompasses all such modified forms thereof as come within the scope of the following claims.

I claim:

1. In a camera having a lens assembly with focus setting and aperture setting adjustment members, a nominal image receiving surface and a focusing analog of the nominal image receiving surface, the improvement comprising means additional to said lens adjustment members for adjusting the location of the image surface of the lens in response to focus and aperture settings of the lens to a predetermined best fit position in relation to the entire area of the nominal image receiving surface when a condition of correct focus is indicated by the focusing analog.

2. The camera of claim 1 wherein the focus setting, the aperture setting and the focal length of the lens are adjustable.

3. The camera of claim 1 wherein the means for adjusting the location of the image surface includes a movably mounted adjustment member independent of the focusing analog adjustably connecting the lens assembly and the body of the camera whereby manual movement of the adjustment member will displace at least one element of the lens assembly with respect to the nominal image receiving surface.

4. The camera of claim 3 wherein indicia are carried on the camera to indicate predetermined positions on the independent adjustment member corresponding to predetermined displacement of the location of the image surface.

5. The camera of claim 1 wherein the means for adjusting the location of the image surface includes means for adjusting the position of the focusing analog to compensate for changes in the shape and position of the image surface caused by adjustment of the lens to thereby locate the image surface in best fit relationship to the nominal image receiving surface when correct focus is indicated by the focusing analog.

6. The camera of claim 5 wherein the means for adjusting the image surface includes an adjustment member which is manually movable from the exterior of the camera and which is operatively connected to the focusing analog whereby movement of the adjustment member between predetermined positions will cause the position of the focusing analog to be adjusted.

7. The camera of claim 6 wherein indicia are carried on the camera to indicate predetermined positions on the adjustment member corresponding to predetermined compensating positions of the focusing analog.

8. The camera of claim 5 wherein the means for adjusting the image surface is operatively connected to the lens assembly to drive the focusing analog to predetermined compensating positions when the lens is adjusted.

9. The camera of claim 8 wherein the lens assembly includes a movable focus setting member for driving the lens focus setting adjustment and a movable aperture setting member for driving the lens aperture setting adjustment, and wherein the image surface adjustment means includes a cam mounted within the lens and having a cam surface, said cam being operatively connected to the focus setting member and the aperture setting member whereby movement of one of said members will cause rotational movement of the cam and movement of the other of said members will cause axial movement of the cam, and wherein the image surface adjustment means also includes a cam follower engaged against the cam surface and includes linkage connecting the cam follower and the focusing analog, whereby the cam follower will be displaced by rotational and axial movement of the cam in response to adjustment of the focus and aperture of the lens by movement of the lens assembly members to drive the focusing analog to its predetermined compensating positions.

10. The camera of claim 9 wherein a sleeve is threadedly engaged within the lens assembly and operatively connected to one of the lens assembly members and the cam whereby movement of the member causes rotation and axial movement of the threaded sleeve which imparts axial movement to the cam.

11. The camera of claim 5 wherein the camera is of the single lens reflex type and the focusing analog is a focusing screen which is mounted in the camera such that the focusing screen is movable in a direction perpendicular to the plane of the screen whereby adjustment of the lens causes movement of the focusing screen optically toward and away from the lens.

12. The camera of claim 11 wherein the means for adjusting the position of the focusing analog includes a frame engaging the focusing screen in supporting relation and being movable in a direction perpendicular to the plane of the focusing screen, a carriage positioned adjacent to the frame and being movable in a direction parallel to the plane of the focusing screen, linkage for driving the carriage back and forth along its path of movement, means for driving the linkage between predetermined positions, and motion transfer means on the frame and carriage for moving the frame in said perpendicular direction in response to movement of the carriage in said parallel direction.

13. The camera of claim 12 wherein the motion transfer means comprises surfaces on the frame and carriage engaged in slidable relation, at least one of the surfaces being inclined to the said parallel and perpendicular directions of motion whereby parallel movement of the carriage surface will impart perpendicular movement to the frame surface.

14. An improved single lens reflex camera of the type having a lens assembly with an adjustable lens including a movable focus setting member for driving the lens focus setting adjustment and a movable aperture setting member for driving the lens aperture setting adjustment, a film holder defining a nominal image receiving surface, and a focusing analog, the improvement comprising:
(a) a cam mounted within the camera and having a cam surface, said cam being operatively connected to the focus setting member and the aperture setting member whereby movement of one of said members will cause rotational movement of the cam and movement of the other of said members will cause axial movement of the cam,
(b) a cam follower engaged against the cam surface for displacement by rotational and axial movement of the cam in response to adjustment of the focus and aperture of the lens by movement of the lens assembly members,
(c) a frame engaging the focusing screen in supporting relation and being movable in a direction perpendicular to the plane of the focusing screen, and
(d) linkage operatively connecting the cam follower and the frame to cause vertical movement of the frame and focusing screen in response to rotational and axial movement of the cam to compensate for changes in the position of the image surface of the lens caused by adjustment of the focus setting and aperture setting to thereby place the image surface in best fit relationship to the nominal image receiving surface when correct focus is indicated by the focusing analog.

15. The camera of claim 14 wherein the adjustable lens includes a movable focal length setting member for driving a focal length setting adjustment of the lens, and further comprising:
(a) a second cam mounted within the camera and having a second cam surface, said second cam being operatively connected to the focal length setting member whereby movement of the focal length setting member will cause movement of the second cam,
(b) a second cam follower engaged against the second cam surface for displacement by movement of the second cam, and
(c) linkage operatively connecting the second cam follower and the linkage between the cam follower and the frame to cause movement of the frame and focusing screen in response to movement of the second cam to compensate for changes in the position of the image surface of the lens caused by adjustment of the focal length setting.

16. An improved single lens reflex camera of the type having a lens assembly with an adjustable lens including a movable focus setting member for driving a lens focus setting adjustment, a movable aperture setting member for driving a lens aperture setting adjustment, a movable focal length setting member for driving a lens focal length setting adjustment, a film holder defining a nominal image receiving surface, and a focusing analog, the improvement comprising:

(a) a cam mounted within the camera and having a cam surface, said cam being operatively connected to two of said movable lens assembly members whereby movement of one of said two members will cause rotational movement of the cam and movement of the other of said two members will cause axial movement of the cam, (b) a cam follower engaged against the cam surface for displacement by rotational and axial movement of the cam in response to adjustment of the two movable lens assembly members, (c) a second cam mounted within the camera and having a cam surface, said cam being operatively connected to the third said movable lens assembly member whereby movement of the third member will cause movement of the second cam, (d) a second cam follower engaged against the second cam surface for displacement by movement of the second cam in response to adjustment of the third movable lens assembly member, (e) a frame engaging the focusing screen in supporting relation and being movable in a direction perpendicular to the plane of the focusing screen, and (f) linkage operatively connecting the two cam followers and the frame to cause vertical movement of the frame and focusing screen in response to rotational and axial movement of the cam and movement of the second cam to compensate for changes in the position of the image surface of the lens caused by adjustment of the lens focus setting, aperture setting, and focal length setting to thereby place the image surface in best fit relationship to the nominal image receiving surface when correct focus is indicated by the focusing analog.

17. The camera of claim 16 wherein the linkage comprises:

(a) a link attached to the cam follower and another link attached to the second cam follower, (b) a cross arm having a pivoted end and a free end, one of the links engaging the free end whereby movement of that link causes movement of the pivoted cross arm, the other of the links being pivotally mounted on the cross arm between its pivoted end and free end and being movable in response to both movement of the cam follower attached thereto and movement of the cross arm, and (c) a carriage engaged by the link pivotally mounted on the cross arm, the carriage also engaging the frame whereby movement of the engaged link will cause vertical movement of the frame.

* * * * *